US006800259B2

(12) United States Patent
Hard

(10) Patent No.: US 6,800,259 B2
(45) Date of Patent: Oct. 5, 2004

(54) METHODS TO CONTROL $H_2S$ AND ARSINE EMISSIONS

(75) Inventor: Robert A. Hard, Hallowell, ME (US)

(73) Assignee: Cabot Corporation, Boston, MA (US)

( * ) Notice: Subject to any disclaimer, the term of this patent is extended or adjusted under 35 U.S.C. 154(b) by 254 days.

(21) Appl. No.: 10/091,377

(22) Filed: Mar. 4, 2002

(65) Prior Publication Data

US 2003/0165416 A1 Sep. 4, 2003

(51) Int. Cl.⁷ .................. C01G 35/00; C01B 17/16; B01J 8/00
(52) U.S. Cl. .............. 423/62; 423/68; 423/225; 423/230; 423/244.06
(58) Field of Search .................. 423/62, 68, 1, 423/658.5, 244.06, 210, 225, 230; 588/251

(56) References Cited

U.S. PATENT DOCUMENTS

| | | | |
|---|---|---|---|
| 1,802,242 A | 4/1931 | Fink et al. | |
| 2,880,060 A | 3/1959 | Campbell et al. | 23/16 |
| 3,658,511 A | 4/1972 | Gustison | 75/101 |
| 3,782,076 A | 1/1974 | Carr et al. | 55/74 |
| 3,789,581 A | 2/1974 | Carr et al. | 55/73 |
| 3,812,652 A | 5/1974 | Carr et al. | 55/68 |
| 4,182,744 A | 1/1980 | Nielsen et al. | 423/68 |
| 4,302,243 A | 11/1981 | Tamaru et al. | 75/1 |
| 4,309,389 A | 1/1982 | Meyer | 423/63 |
| 4,495,158 A | 1/1985 | Ritsko et al. | 423/65 |
| 4,593,148 A | 6/1986 | Johnson et al. | 585/823 |
| 4,605,812 A | 8/1986 | Nowack et al. | 585/845 |
| 4,663,130 A | 5/1987 | Bergman et al. | 423/68 |
| 4,877,920 A | 10/1989 | Lush et al. | 585/823 |
| 4,888,157 A | 12/1989 | Carnell et al. | 423/230 |
| 4,962,272 A | 10/1990 | Cullo et al. | 585/826 |
| 4,996,030 A | * 2/1991 | Kitahara et al. | 423/210 |
| 5,023,059 A | 6/1991 | Bielecki et al. | 423/9 |
| 5,182,088 A | 1/1993 | Leondaridis et al. | 423/210 |
| 5,384,105 A | 1/1995 | Carlson | 423/65 |
| 5,658,541 A | 8/1997 | Matros et al. | 423/210 |
| 6,007,706 A | 12/1999 | Carnell, Jr. | 208/303 |
| 6,099,819 A | 8/2000 | Srinivas et al. | 423/573.1 |
| 6,338,832 B1 | 1/2002 | Brown et al. | 423/592 |
| 6,348,113 B1 | 2/2002 | Michaluk et al. | 148/668 |

FOREIGN PATENT DOCUMENTS

| | | |
|---|---|---|
| AU | 80776 98 A | 2/1999 |
| CA | 1 179 509 A | 12/1984 |
| JP | 06 025771 A | 2/1994 |
| RU | 2 097 128 C | 11/1997 |

OTHER PUBLICATIONS

SU 865828 abstract, Sep. 1981.*
"Hydrogen Sulfide," Subcommitte on Hydrogen Sulfide National Research Council—pp. 2–8, 16–17, and 150–172 (No date provided).
Bowker, P.G. "Design Manual—Odor and Corrosion Control in Sanitary Sewerage Systems and Treatment Plants," pp. 4, 6,, and 72–76,Oct. 1985.
Kirk–Othmer, Encyclopedia of Chemical Technology, vol. 22, pp. 114–122, vol. 6, pp. 819–869; vol. 7, pp. 97–109; vol. 10, pp. 734–739; vol. 17, pp. 527–534, no date.
Paul L. Magill, et al., "Air Pollution Sources and Their Control," Air Pollution Handbook, pp. 1–1, 1–30 to 1–41, 13–73 to 13–106, 1956, no month.
Noel de Nevers, "Chapter 11, Control of Sulfur Oxides," Air Pollution Control Engineering, pp. 328–371, no month, 1995.
Anonymous "Lube Oil Additives and Finished Oil Deodorisation–by Treating with Oil–Soluble Copper Salt Dissolved in Mineral Oil", vol. 326, No. 043, Jun. 10, 1991, Great Britain. (Abstract only).
International Search Report for PCT/US03/06432, dated Jul. 4, 2003.

* cited by examiner

Primary Examiner—Steven Bos

(57) ABSTRACT

Methods to control hydrogen sulfide and/or arsine emissions are described. The method involves adding at least one copper compound (such as a copper(II) compound) to the material, such as material containing sulfur in a sufficient amount to control said emissions. The material that is treated with the copper compound(s) is preferably an ore, such as a valve metal containing ore.

21 Claims, No Drawings

METHODS TO CONTROL H₂S AND ARSINE EMISSIONS

BACKGROUND OF THE INVENTION

The present invention relates to controlling sulfur and arsine emissions. The present invention more particularly relates to the control of hydrogen sulfide and arsine emissions during the processing of ore, such as tantalum-bearing ore.

The control of some emissions, such as hydrogen sulfide or arsine, are important since such emissions are either identified as pollutants or at a minimum create undesirable odors. In the processing of ore, such as tantalum-bearing ore, ore can contain various amounts of sulfur which can be released upon the processing of the ore. For instance, when various materials are recovered from ore such as metals, the ore is typically crushed and then subjected to a digestion. In the digestion, the ore is subjected to various treatments such as an acid treatment, which is used to dissolve various parts of the ore in order to aid in the recovery of the targeted materials. In the case of tantalum-bearing ore, tantalum is typically recovered from tantalum-bearing ore by subjecting the crushed ore to a digestion wherein acids, such as hydrofluoric acid, are mixed into the crushed ore in order to dissolve the ore to form a digestion liquor and typically an ore residue. The tantalum which is present as a tantalum compound is then dissolved by such a acid treatment and recovered by solvent extraction and other techniques, for instance as described in U.S. Pat. Nos. 6,338,832, 6,348,113 and in Miller, "Tantalum and Niobium" (Academic Press, Inc., Publishers, 1959), for instance but not limited to, pages 1–100, all patents and publications incorporated in their entirety by reference herein. During this digestion the sulfur and possible arsine are released.

While there may be various techniques to remove the sulfur prior to being subjected to a digestion process, such efforts are costly and typically may not remove all of the sulfur necessary to reduce sulfur odor. Furthermore, activated carbon could be used, however the activated carbon would create a cumbersome process and the activated carbon may be temperature sensitive. Furthermore, the activated carbon most likely would increase the amount of ore residue. Furthermore, past experience has shown that activated carbon may not be a consistent system with its results on a day to day operation.

Also, a caustic scrub could be used to eliminate the sulfur odor. However, the cost of using such a caustic scrub is very expensive and the maintenance of maintaining a scrubber can be costly as well.

Also, a carbon bed could be used to reduce sulfur odor. However, these carbon beds are also quite expensive and there is a large operating cost to maintain the equipment. Also, especially with processing of tantalum-bearing ore, carbon beds may not be the most efficient equipment to use due to high temperatures and oxygen running through the beds.

Accordingly, there is a need to provide an effective means to control hydrogen sulfide and/or arsine emissions in a cost efficient manner.

All the patents and publications mentioned above and throughout are incorporated in their entirety by reference herein.

SUMMARY OF THE PRESENT INVENTION

A feature of the present invention is to provide methods to control hydrogen sulfide and/or arsine emissions, especially during the processing of ore.

Another feature of the present invention is to provide a method to control hydrogen sulfide and/or arsine emissions which do not require expensive equipment or materials.

A further feature of the present invention is to provide a method to control hydrogen sulfide and/or arsine emissions which are safe, efficient, and do not increase ore residue nor effect the quality of the material being recovered from, for instance, the ore.

Additional features and advantages of the present invention will be set forth in part in the description that follows, and in part will be apparent from the description, or may be learned by practice of the present invention. The objectives and other advantages of the present invention will be realized and attained by means of the elements and combinations particularly pointed out in the description and appended claims.

To achieve these and other advantages, and in accordance with the purposes of the present invention, as embodied and broadly described herein, the present invention relates to a method to control hydrogen sulfide and/or arsine emissions by adding at least one copper compound to the material which causes the hydrogen sulfide or arsine emissions.

The present invention further relates to a method to control hydrogen sulfide and/or arsine emissions during the processing of ore. The method includes adding at least one copper compound to the ore in an amount sufficient to control the emissions.

The present invention further relates to methods to control hydrogen sulfide and/or arsine emissions during the digestion of ore, such as tantalum-bearing ore. The method involves adding at least one copper compound to the tantalum-bearing ore during the digestion.

It is to be understood that both the foregoing general description and the following detailed description are exemplary and explanatory only and are intended to provide a further explanation of the present invention, as claimed.

DETAILED DESCRIPTION OF THE PRESENT INVENTION

The present invention relates to methods to control sulfur containing emissions and/or arsine emissions. More particularly, the present invention preferably relates to methods to control hydrogen sulfide and/or arsine emissions resulting from the processing (e.g., recovery of metal(s)) of materials such as ore.

For purposes of the present invention, "controlling" sulfur containing emissions or arsine emissions or both is understood to mean the reduction or elimination of sulfur containing emissions and/or arsine emissions in a material, such as emissions caused from the processing of ore. The reduction of the hydrogen sulfide and/or arsine emissions can be any reduction, such as a reduction of from about 1% to about 100% and more preferably, from about 25% to about 100% and even more preferably, from about 50% to about 100% total reduction in the hydrogen sulfide and/or arsine emissions as compared to a control wherein no suppression techniques are used. Preferably, the methods of the present invention result in the complete or near complete reduction of the hydrogen sulfide and/or arsine emissions or reduction to levels which are acceptable such that no sulfur and/or arsine odors are present (e.g., below 500 ppm and more preferably, below 100 ppm or below 50 ppm or below 25 ppm or below 10 ppm over a period of at least one hour, and more preferably at least 5 hours or at least 8 hours). With the present invention, preferably no perfumes are needed to mask the odor.

In the present invention, hydrogen sulfide and/or arsine emissions are controlled with the addition of at least one copper compound during the processing of the material. As indicated, the material which is preferably a solid material is a ore. The ore is more preferably a tantalum-bearing ore. Examples of tantalum-bearing ore include, but are not limited to, tantalite ore, pegmatite structures, carbonitite, apo-granite, alkaline complex, pegmatitic granite, and/or scam. The typical tantalum containing minerals include wodginite, pyrochlore-microlite group, microlite, Simpsonsite, colombo-tantalite group (covers tantalite), ixiolite, bismutio-tantalite, tapiolite, and the like. Titano-wodginite, rankamaite and any tantalum-bearing oxide minerals are some other minerals. Typically, many of these tantalum-bearing minerals contains 50 to 70% or more $Ta_2O_5$.

In the recovery of materials, such as metals, from ore, typically the ore is reduced to a suitable processing size. Typically, the ore is crushed for purposes of creating this processing size. In the case of tantalum-bearing ore, the ore is crushed to a size of −60 mesh and preferably from about 100 mesh to about −500 mesh, though other sizes can be used. The ore is then subjected to processing in order to separate the unwanted ore materials from the ore materials that are to be recovered. In the case of tantalum, the tantalum-bearing ore is typically subjected to a digestion stage wherein the tantalum-bearing ore is subjected to an acid type treatment in order to dissolve the tantalum compound in the ore, so that the tantalum is present in a digestion liquor which is then subjected to various downstream stages including solvent extraction and the like. During this digestion, sulfur which can typically be present in ore is released generally as hydrogen sulfide causing unwanted odor. In the present process, at least one copper compound is added to the material to be processed. In the preferred embodiment, the copper compound is introduced to the ore, preferably crushed ore, such that the copper compound is preferably distributed throughout the crushed ore during the processing of the ore. In the case of tantalum bearing ore, the digestion process would involve acid, such as hydrofluoric acid, which is added to the tantalum bearing ore to form a slurry. The copper compound can be introduced at any time during the digestion period. Preferably, the entire effective amount of the copper compound is introduced at the beginning of the digestion. Furthermore, the copper compound can be introduced by batch or can be continuously fed into the digestion chamber or digester. Preferably, the copper compound is continuously fed in the digestion chamber in order to maintain a sufficient amount of copper compound(s) in order to control the sulfur containing emissions and/or arsine emissions. The copper compound can be introduced into the digestion chamber by any means such as any apparatus used to feed powders into a reaction chamber. For instance, the copper compound can be introduced by dumping bags of the copper compound into the digester or the copper compound can be fed by metering the copper compound into the digester. Any conventional techniques used to introduce a solid, such as a powder, into a reactor can be used in the present invention. Also, the copper compound can be introduced as slurry or dissolved in a liquid.

Preferably, the copper compound is a copper oxide or copper sulfate such as $CuO$ and/or $CuSO_4$. The copper compound can be any copper (II) containing compound such as $CuCl_2$ and the like. These compounds are commercially available from a variety of sources such as, but not limited to, Peninsula Copper Industries, Inc., Mallinckrodt, and Arlington International, Inc. The copper oxide is also known as cupric oxide. Any purity of the copper compound can be used. Preferably, higher purity copper compounds are used.

As indicated above, preferably, the copper compound is added to the digestion chamber or digester at the start of digestion in order to avoid any release of hydrogen sulfide or arsine emissions. Typically, tantalum bearing ore can contain sulfur amounts of from about 0.02 or less to about 0.7 weight percent or more based on the total weight of the ore.

Preferably, the amount of copper compound added is from about 0.1 or less to about 5 weight percent or more copper compound based on the weight of the ore. More preferably, with respect to the preferred copper compound, namely CuO, the amount of copper oxide added is from about 0.1 to about 5 weight percent based on the weight of the ore. More preferably, for instance, generally a 1 to 1 weight ratio of copper oxide to sulfur present in the ore is used to effectively control the hydrogen sulfide and/or arsine emissions. Other weight ratios include 0.5:1 to 2.5:1 (copper compound to sulfur present). Other amounts can be used depending upon the desired reduction of emissions and the sulfur present in the ore.

The copper compound that is used in the present invention is easily incorporated into the conventional process of the digestion of ore and therefore no added steps need to be taken to address the addition of the copper compound. As indicated above, the copper compound does not affect the amount of tantalum recovered from the tantalum-bearing ore nor does the copper compound greatly increase the ore residue. Thus, the addition of the copper compound is cost effective and effective in reducing the hydrogen sulfide or arsine emissions.

The present invention will be further clarified by the following examples, which are intended to be exemplary of the present invention.

EXAMPLES

Example 1

In a plant trial, without any copper oxide or other copper compound added, during the digestion of tantalum bearing ore, the measured $H_2S$ emission was 542 ppm. The tantalum bearing ore during the digestion was mixed with water and a 70% HF acid. Generally, about 2,000 gallons of 70% HF and about 2,800 gallons of water was added to about 17,000 pounds of tantalum-bearing crushed ore.

In a separate plant trial, the experiment was repeated but copper oxide was added to the digester in an amount of from about 0.5 to about 1 pound of copper oxide per calculated sulfur amount present in the ore. The measured $H_2S$ was 75 ppm which was a significant reduction in the hydrogen sulfide emissions.

The same experiment was again repeated but this time the amount of copper oxide was increased to an amount of about 2.0 pounds of copper oxide per pound of calculated sulfur present in the ore during the digestion. The measured $H_2S$ emissions were about 0 PPM. With respect to the introduction of the copper oxide, the copper oxide was introduced in its entirety prior to the start of the digestion.

With respect to the copper oxide used in these plant trials, it was determined that the copper oxide addition during the digestion stage effectively reduces hydrogen sulfide emissions and is relatively inexpensive and easy to implement. Furthermore, the addition of the copper oxide did not adversely affect the quality and amount of tantalum recovered. In addition, it was determined that the copper from the copper oxide tracts favorably downstream of digestion and does not contaminate the tantalum fraction and the majority of the copper ends up in the landfill cake.

Example 2

Another trial was conducted wherein the amounts of hydrogen sulfide and arsine were measured. The table below shows the results for the control with no copper oxide present as well as the addition of copper oxide. Furthermore, the table shows the time of the copper oxide in the digester.

| Run | Conditions: | |
| --- | --- | --- |
| | Feed Time | Cu/Ore(wt %) |
| "Control" | 22-hr | 0 |
| Trial #1 | 22-hr | 0.18% |

| | $H_2S$ | | | Arsine | |
| --- | --- | --- | --- | --- | --- |
| Time in Feed | Control (ppm) | Trial #1 (ppm) | % Sup. | Control (ppm) | Trial #1 (ppm) |
| 1 hr | 45 | 4 | 91% | >10 | 1.5 |
| 3 hr | 190 | 9 | 95% | >10 | >2 |
| 8 hr | 500 | 35 | 93% | >10 | >10 |

All Values in "ppm"

As can be seen in the table, the copper oxide effectively and significantly reduced the amount of hydrogen sulfide and arsine emissions in the ore during the digestion stage.

Other embodiments of the present invention will be apparent to those skilled in the art from consideration of the specification and practice of the invention disclosed herein. It is intended that the specification and examples be considered as exemplary only, with a true scope and spirit of the invention being indicated by the following claims and equivalents thereof.

What is claimed is:

1. A method to control hydrogen sulfide or arsine emissions or both during the processing of ore comprising adding at least one copper compound to said ore in an amount sufficient to control said emissions, wherein said ore is tantalum-bearing ore.

2. The method of claim 1, wherein said at least one copper compound is CuO or $CuSO_4$ or both.

3. The method of claim 1, wherein said at least one copper compound is copper oxide.

4. The method of claim 1, wherein said tantalum bearing ore is pegmatite, carbonite, apo-granite, alkaline complex, pegmatitic granite, scarn or combinations thereof.

5. The method of claim 1, wherein said at least one copper compound is added in an amount of from about 0.1 to about 5 weight percent based on the weight of the ore.

6. The method of claim 1, wherein said at least one copper compound is added in an amount of from about 0.1 to about 1.0 weight percent based on the weight of the ore.

7. A method to control hydrogen sulfide or arsine emissions or both during the digestion of tantalum bearing ore comprising adding at least one copper compound to said tantalum-bearing ore prior to or during said digestion, or both.

8. The method of claim 7, wherein said digestion occurs by contacting said tantalum-bearing ore with at least one acid.

9. The method of claim 8, wherein said acid comprises HF acid.

10. The method of claim 7, wherein said at least one copper compound is copper oxide.

11. The method of claim 7, wherein said at least one copper compound is CuO, $CuSO_4$, or both.

12. The method of claim 7, wherein said at least one copper compound is added prior to the digestion.

13. The method of claim 7, wherein said at least one copper compound is added on a continuous basis to said tantalum-bearing ore during said digestion.

14. The method of claim 7, wherein said at least one copper compound is added batchwise to said tantalum-bearing ore during said digestion.

15. The method of claim 7, wherein said hydrogen sulfide emissions are reduced by 50% compared to digestion where no copper compound is present.

16. The method of claim 7, wherein said hydrogen sulfide emissions are reduced by at least 90% compared to digestion wherein no copper compound is used.

17. The method of claim 7, wherein said at least one copper compound is added in a weight ratio of from about 0.5:1 to 2.5:1, copper compound to sulfur present in ore.

18. The method of claim 7, wherein said at least one copper compound is added in an amount of from about 0.1 to about 5 weight percent based on the weight of the ore.

19. A method to control hydrogen sulfide or arsine emissions or both during the processing of material containing sulfur comprising adding at least one copper compound to said material in an amount sufficient to control said emissions, wherein said material is a valve metal comprising ore.

20. The method of claim 19, wherein said at least one copper compound is a copper oxide.

21. The method of claim 19, wherein said at least one copper compound is added to said material during digestion of said material.

* * * * *